United States Patent [19]

DiTullio

[11] 4,244,249
[45] Jan. 13, 1981

[54] APPARATUS FOR CONSTRUCTING BREAST CUPS

[75] Inventor: Flavia DiTullio, New York, N.Y.

[73] Assignee: Hanes Corporation, Winston-Salem, N.C.

[21] Appl. No.: 92,682

[22] Filed: Nov. 9, 1979

Related U.S. Application Data

[62] Division of Ser. No. 830,398, Sep. 6, 1977, Pat. No. 4,202,853.

[51] Int. Cl.³ .................... B29C 17/08; B29C 17/03; B29D 31/00
[52] U.S. Cl. ........................................ 83/139; 83/52; 83/382; 83/681; 83/914
[58] Field of Search .................. 83/139, 138, 382, 17, 83/19, 20, 21, 52, 55, 656, 681, 682, 914

[56] References Cited

U.S. PATENT DOCUMENTS

| | | |
|---|---|---|
| 3,058,154 | 10/1962 | Howard . |
| 3,077,196 | 2/1963 | Paxton .................................. 128/468 |
| 3,461,761 | 8/1969 | Mojonnier ........................ 83/914 X |
| 3,808,927 | 5/1974 | Neil ........................................ 83/228 |
| 4,063,477 | 12/1977 | Hantke ............................... 83/382 X |
| 4,104,349 | 8/1978 | Hillgenberg ......................... 264/153 |

Primary Examiner—J. M. Meister
Attorney, Agent, or Firm—Charles Y. Lackey; William S. Burden

[57] ABSTRACT

Breast cups having various types of cuts or configurations are initially molded from basically flat sheets of flexible fabric on a bust cup mold having a prescribed configuration. The resulting, three-dimensional molded fabric cup then is cut by a die having a plurality of cutting surfaces, at least a portion of the outermost cutting surfaces serving as guides for alignment with the outer perimeter of the molded cup and a portion of the cutting surfaces cutting the molded breast cup to the desired shape resulting in a breast cup having a size and configuration differing from that of a bust cup initially molded.

9 Claims, 11 Drawing Figures

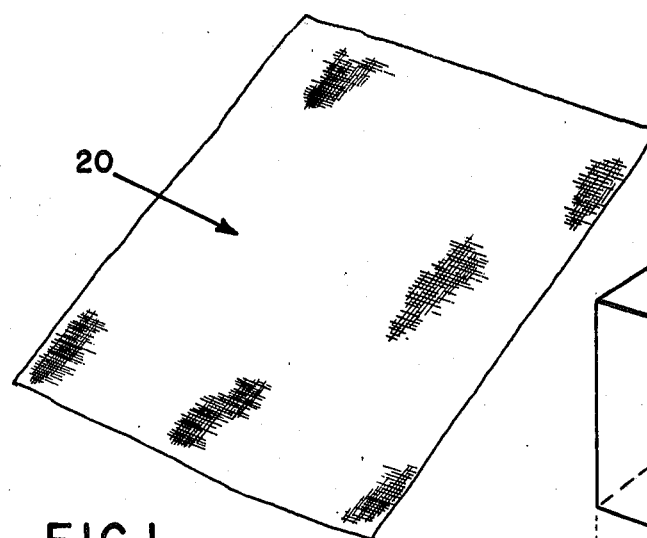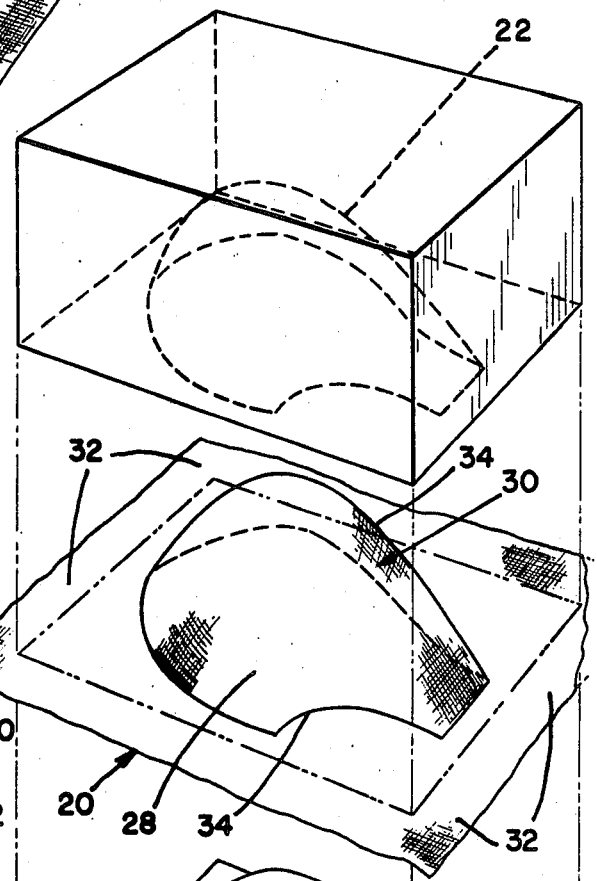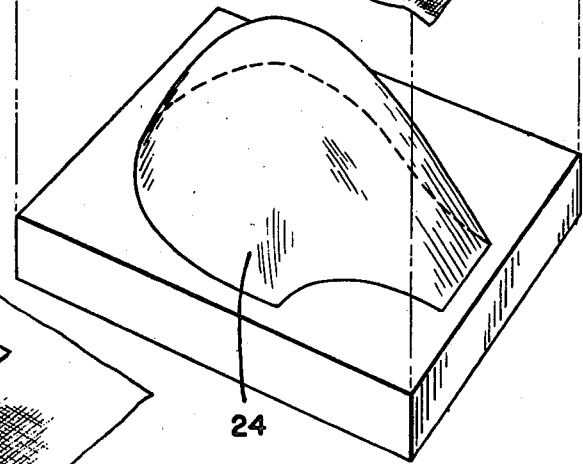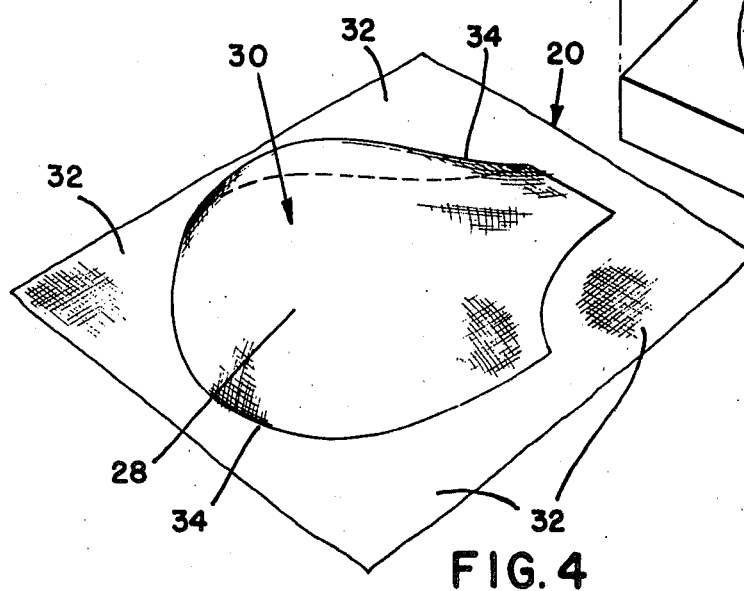

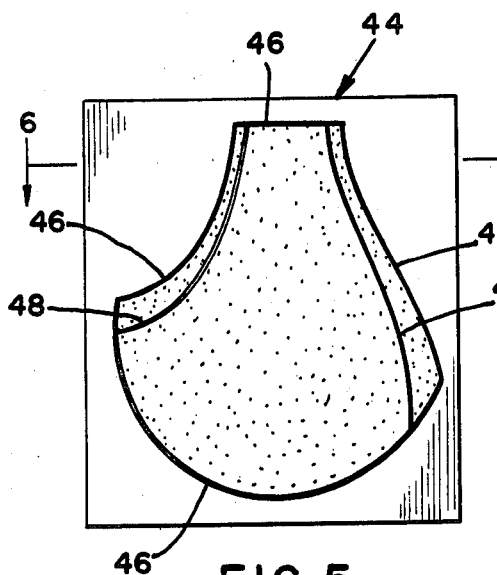
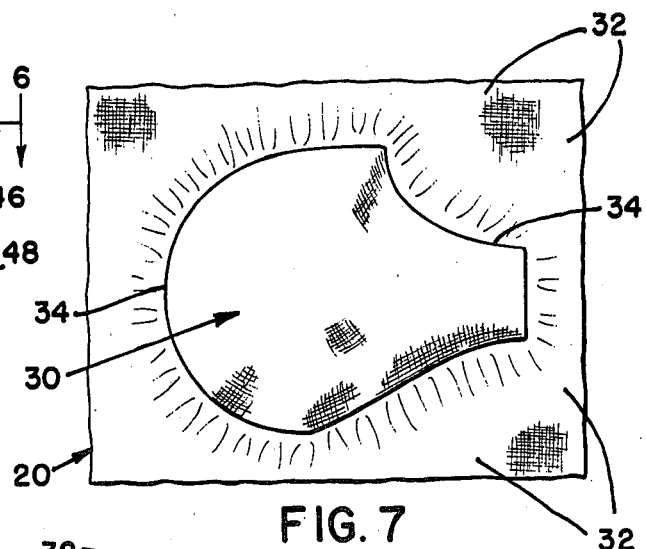
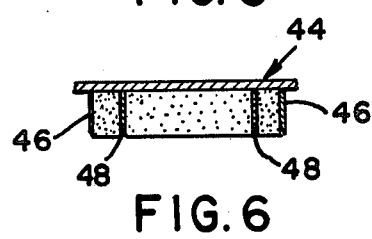
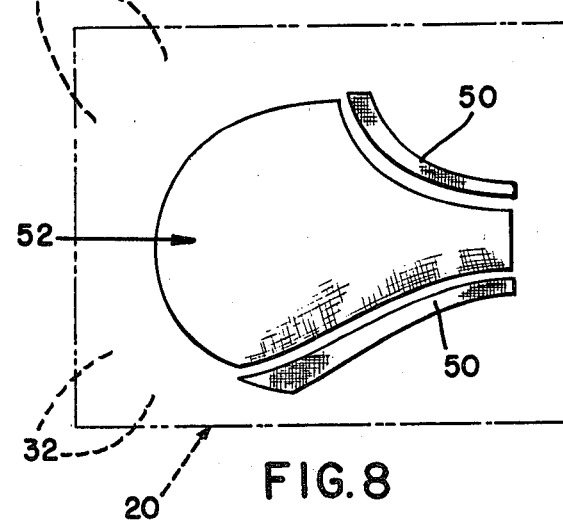
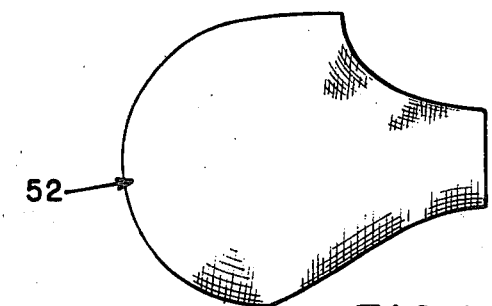
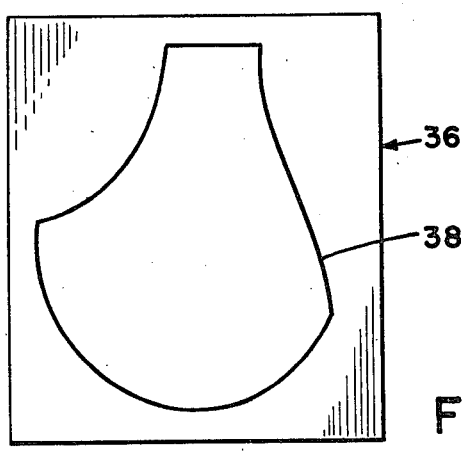
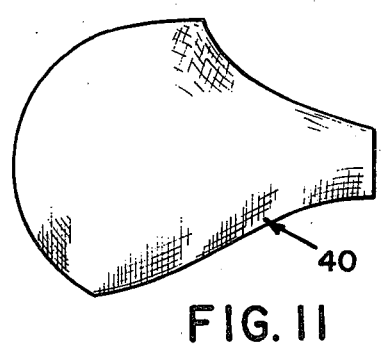

APPARATUS FOR CONSTRUCTING BREAST CUPS

This is a division of application Ser. No. 830,398, filed Sept. 6, 1977, now U.S. Pat. No. 4,202,853.

BACKGROUND, BRIEF SUMMARY AND OBJECTS OF THE INVENTION

This invention relates generally to molded fabric breast receiving and supporting members, and more particularly to the molding of the members from a relatively flat fabric, and to the die cutting of the molded fabric.

It has been the conventional practice to form generally flat fabrics into three-dimensional brassiere cups by cutting, fitting and sewing a plurality of fabric pieces into the desired shape, or by molding and die cutting a generally flat piece of fabric into the desired shape.

Cutting and sewing a plurality of fabric segments to form the cup portions of the brassiere is not only costly and time consuming but also results in undesirable seams and ridges.

Cups incorporating the more natural contour of the breast have been molded by heat setting thermoplastic yarns of a single piece of fabric into a given cup configuration. The molded cup is cut from the surrounding unmolded fabric and integrated in a brassiere construction. Generally breast-shaped molds having the desired peripheral surface or degree of contouring are relatively expensive to fabricate. Therefore, the cost involved in providing new molds for each variation in the cut or shape of a cup has been prohibitive.

The present invention is directed to a system for obtaining such variations or modifications in the cut of a cup molded from a fabric piece while utilizing the same mold, thus eliminating the need for a different mold for each cup having a different cut.

Briefly, breast receiving cups are formed from relatively flat fabric sheets of thermoplastic yarns by heat setting selected portions of the fabric while in a mold of a desired peripheral contour. Subsequently, the three-dimensional cup is severed by a die, having a plurality of cutting edges or surfaces, to the desired cut or shape.

One of the primary objects of the invention is the provision of a new and improved process for making one piece brassiere cups.

Another object of the invention is the provision of a system for forming breast cups of various cuts or shapes after heat setting portions of a fabric piece to the desired contour within a common mold.

A further object of the invention is the provision of a new system for efficiently manufacturing at relatively low cost, brassiere cups having various cuts from fabrics heat set on a common mold.

Other objects and advantages of the invention will become apparent from the following detailed description of the invention taken with the drawings, in which:

BRIEF DESCRIPTION OF THE DRAWING

FIG. 1 is a perspective view of a sheet of fabric in its flat form prior to molding;

FIG. 2 is a cross-sectional view of the fabric within a mold;

FIG. 3 is an exploded, perspective view of the female and male members of the mold and the molded cup prior to cutting of the cup to the desired shape;

FIG. 4 is a perspective view of the breast cup before it is cut from the surrounding unmolded portions of the fabric sheet;

FIG. 5 is a bottom plan view of an open type die having plural cutting edges;

FIG. 6 is a sectional view taken along line 6—6 of FIG. 5;

FIG. 7 is a top plan view of the fabric illustrating the molded cup portion and the surrounding unmolded portions;

FIG. 8 is a top plan view of the fabric of FIG. 7 and illustrating the several pieces to be discarded after severing with a die of FIG. 5;

FIG. 9 is a top plan view of the molded fabric cup unit of the desired shape after severing with the die of FIG. 5;

FIG. 10 is a bottom plan view of a conventional die; and

FIG. 11 is a top plan view of the molded fabric cup unit of a desired shape after severing with a die of FIG. 10.

DETAILED DESCRIPTION OF THE INVENTION

In FIG. 1, the fabric section or sheet 20, formed at least partially of thermoplastic yarns, is illustrated in its generally flattened stage before being molded or deformed by heat setting the yarns. The fabric sheet 20 may be of various yarns and fabric constructions, knitted or woven, wherein at least a portion of the yarns are capable of being set or stabilized by heat. Preferably, the sheet 20 is of a lightweight, sheer, flexible layer of fabric.

In one example of the invention, the fabric sheet 20 may be placed in a mold 26 between complementary sections 22 and 24, FIGS. 2 and 3. The molded sections 22, 24 may be heated to the desired temperature, which may be within the range of 350° Fahrenheit depending upon the particular fibers being heat set, in a hot drawing process, or the fabric sheet 20 may be heated by a suitable means prior to being deformed and set between the mold sections 22, 24. Depending upon the types of yarn used, etc., the fabric may be molded by various other means, such as positioning the fabric sheet over a single mold section within a steam chamber, or by other means wherein a controlled wet or dry heat is applied to all portions of the sheet to be molded. The temperature to which the fabric is exposed and the duration of the heat treatment are controlled such that the yarns are heat set without undue softening. The mold 26 is shaped and formed to the desired peripheral contour and may be of various suitable materials and constructions. While a single mold and single piece of fabric have been illustrated, it is to be understood that a plurality of fabric sheets may be molded simultaneously. In the mold illustrated, preferably, there is no space between the outer surface of the male section 24 and the inner surface of the female section 22 when the sections are closed.

After molding, the resulting fabric sheet 20 includes a three-dimensional molded fabric surface 28 defining a breast cup section 30 having a prescribed peripheral contour corresponding to the contour of the complementary sections 22, 24 of the mold 26, and unmolded, fabric sections 32. The breast cup 30 has a marginal edge 34 which conforms to the base of the mold 26, that is, that peripheral portion of the mold surrounding the three-dimensional portions of the complementary sections 22, 24. The heat set cup 30 resists wrinkling and tends to remain in its molded three-dimensional shape.

The sheet 20 of FIG. 4, having molded and unmolded sections, now may be severed along the marginal edge 34 by an open type die 36 having a cutting edge 38, FIG. 10. Cutting of the fabric along the marginal edge 34 results in a molded breast cup 40 having the shape and configuration as shown by FIG. 11.

In prior practice, when it became desirable or necessary to alter or modify the shape or configuration of a cup 40, it has been necessary to provide a new mold for each change or modification. The fabrication of such molds is expensive and time consuming.

The present invention permits brassiere cups having a plurality of shapes and configurations to be molded upon a common mold and selectively cut by new and improved dies having a plurality of cutting edges or surfaces.

FIG. 5 illustrates one such die 44 having outer peripheral cutting edges 46 and cutting edges 48 spaced inwardly of the outer edges 46.

The peripheral cutting edges 46 of the die 44 generally have the same configuration as the marginal edge 34 of the three-dimensional molded cup section 30, FIGS. 4 and 7, after molding.

The outer cutting edges 46 serve as a guide for alignment with a marginal edge 34 as well as cutting the fabric to sever the unmolded sections or portions 32 from the molded cup 30. The inner cutting edges 48 are spaced inwardly of at least portions of the cutting edges 46 and serve to remove selected molded portions 50 from the cup 30 to form a new cup 52 having a modified shape or configuration, as illustrated by FIG. 9. It will be obvious that dies, such as die 44, having cutting edges 48 in a variety of configurations may be spaced inwardly of the outer cutting edges 46 depending upon the desired shape or contour of a brassiere cup. Such dies eliminate the need for a different mold for each different cut of brassiere cup.

The outside perimeter of the die, the cutting edges 46 space outwardly of cutting edges 48, are required due to the molded shape of the fabric, and to prevent wrinkling or ripples in the molded areas during cutting by the edges 48. A plurality of fabric sheets 20, each having molded and unmolded sections, may be cut simultaneously.

Rubber or other soft resilient material may be provided between the cutting edges 46, 48, as shown by FIG. 6, if the fabric has a tendency to ripple when die cutting.

It is contemplated that the breast cups 52 may be employed with bathing suit tops, halters, breast receiving liners for garments, etc., as well as brassieres.

What is claimed is:

1. An apparatus for shaping a molded breast cup having a smooth, seamless interior and exterior from a unitary fabric sheet having unmolded portions and a molded section, said molded section defining a three-dimensional peripheral contour of a prescribed configuration provided with a marginal edge contiguous with the unmolded portions, the improvement comprising a first means for severing the unmolded fabric portions from the molded section along the marginal edge, and a second means for removing selected portions of the molded section inwardly of said marginal edge to alter the size and configuration of the three-dimensional, peripherally contoured molded section, said first and second means being mounted upon a common support.

2. Apparatus as recited in claim 1, wherein said first means includes a cutting surface having a configuration corresponding generally to the configuration of said molded section marginal edge.

3. Apparatus as recited in claim 2, wherein said second means includes at least one cutting surface spaced inwardly from said first cutting surface for severing portions of said molded section to alter the three-dimensional peripheral contour thereof.

4. Apparatus as recited in claim 3, and further including resilient means positioned intermediate the cutting surface of said first means and the cutting surface of said second means to prevent rippling of the sheet when cutting.

5. Apparatus as in claim 1, wherein said cutting surface of said first means and said cutting surface of said second means are spaced from said support means equal distance which are sufficient to cut a plurality of fabric sheets simultaneously.

6. Apparatus as recited in claim 3, wherein said second cutting means includes a plurality of discrete members each having cutting surfaces spaced inwardly of said first cutting surface.

7. Apparatus as recited in claim 6, and further including resilient means positioned intermediate the cutting surfaces of said first means and said second means, and intermediate the cutting surfaces of said discrete members.

8. Apparatus as recited in claim 7 wherein said resilient means extends outwardly from said common support a distance substantially equal to the outermost edges of said cutting surfaces of said first means and said second means.

9. Apparatus as recited in claim 8, wherein said resilient means is soft rubber.

* * * * *